(12) United States Patent
Sweeney

(10) Patent No.: US 7,835,545 B2
(45) Date of Patent: Nov. 16, 2010

(54) SYSTEM AND METHOD FOR PROVIDING A VISUAL LANGUAGE FOR NON-READING SIGHTED PERSONS

(75) Inventor: Wylene Sweeney, York, PA (US)

(73) Assignee: Techenable, Inc., York, PA (US)

( * ) Notice: Subject to any disclaimer, the term of this patent is extended or adjusted under 35 U.S.C. 154(b) by 1458 days.

(21) Appl. No.: 11/230,026

(22) Filed: Sep. 19, 2005

(65) Prior Publication Data

US 2006/0008123 A1  Jan. 12, 2006

Related U.S. Application Data

(63) Continuation-in-part of application No. 10/685,102, filed on Oct. 14, 2003, now Pat. No. 7,287,984.

(60) Provisional application No. 60/459,063, filed on Mar. 28, 2003, provisional application No. 60/418,533, filed on Oct. 15, 2002.

(51) Int. Cl.
G06K 9/00  (2006.01)

(52) U.S. Cl. ........................ 382/114; 434/114

(58) Field of Classification Search ................ 382/114, 382/198, 312; 704/235, 7, 2, 10; 434/112, 434/113, 114
See application file for complete search history.

(56) References Cited

U.S. PATENT DOCUMENTS

| | | | |
|---|---|---|---|
| 3,918,029 A | 11/1975 | Lemelson | |
| 4,275,381 A | 6/1981 | Siegal | |
| 4,283,622 A | 8/1981 | Passer et al. | |
| 4,323,772 A | 4/1982 | Serge | |
| 4,329,574 A | 5/1982 | Jordan, Jr. | |
| 5,169,342 A * | 12/1992 | Steele et al. | 434/112 |
| 5,243,655 A | 9/1993 | Wang | |
| 5,710,417 A | 1/1998 | Joseph et al. | |
| 5,742,779 A * | 4/1998 | Steele et al. | 715/839 |
| 5,982,911 A | 11/1999 | Matsumoto et al. | |
| 6,437,875 B1 | 8/2002 | Unno | |
| 6,525,513 B1 | 2/2003 | Thompson | |
| 6,542,623 B1 | 4/2003 | Kahn | |
| 6,621,070 B2 | 9/2003 | Ahten et al. | |
| 7,076,738 B2 * | 7/2006 | Baker et al. | 715/763 |
| 2006/0259295 A1 * | 11/2006 | Ellenson | 704/10 |

* cited by examiner

Primary Examiner—Bhavesh M Mehta
Assistant Examiner—Sean Motsinger
(74) Attorney, Agent, or Firm—Duane Morris LLP

(57) ABSTRACT

A method and system for supporting and augmenting a non-reading sighted person's capabilities to interact with her environment using visual language hieroglyphics and computer sensory perception. This invention provides navigational support by displaying orientation hieroglyphics in a dialog with the user similar to that of a "seeing-eye" dog and visually-disabled owner. The present invention supports and augments a person's capability to plan, problem solve, and learn. This is accomplished through interactive dialogue executed in real time between the non-reading sighted person and the system, by utilizing an artificially intelligent method for providing visual communication and cognitive reasoning support for non-reading sighted persons.

25 Claims, 13 Drawing Sheets

User FSM

SYSTEM AND METHOD FOR PROVIDING A VISUAL LANGUAGE FOR NON-READING SIGHTED PERSONS

CROSS-REFERENCE TO RELATED APPLICATIONS

This application is a continuation-in-part application of U.S. application Ser. No. 10/685,102, filed on Oct. 14, 2003, now U.S. Pat. No. 7,287,984, which itself claims priority from Provisional Patent Application Ser. Nos. 60/418,533, filed Oct. 15, 2002, and 60/459,063, filed Mar. 28, 2003.

FIELD OF THE INVENTION

The present invention generally relates to communications systems for non-reading sighted persons and, more particularly, to a system and method that integrates artificial intelligence in providing a visual language for non-reading sighted persons such as the cognitively disabled.

BACKGROUND OF THE INVENTION

This invention is a continuation-in-part of patent application Ser. No. 10/685,102, filed Oct. 14, 2003, the entire contents of which are incorporated herein. Patent application Ser. No. 10/685,102 discloses a method and system for communicating to sighted persons who cannot read a standard alphanumeric text, the informational content of that text. This present invention builds upon the system and method disclosed by patent application Ser. No. 10/685,102 by integrating artificial intelligence to provide cognitive support for non-reading sighted persons, thereby enabling non-reading sighted persons to interact and communicate with their surrounding environment.

Artificial intelligence (also known as machine intelligence and often abbreviated as AI) is intelligence exhibited by any manufactured (i.e. artificial) system. The term is often applied to general purpose computers and to the scientific investigation of the theory and mechanics of human intelligence and cognition. The bulk of AI research is concerned with producing useful machines that can automate human tasks that require intelligent behavior. AI systems are now in routine use in many businesses, hospitals and military units around the world, as well as being built into many common home computer software applications and video games. Such non-limiting examples of AI include: scheduling resources, answering questions about products for customers, and understanding and transcribing speech. Since its inception, AI research has placed a great emphasis on providing automated solutions to practical problems, based on replicating the architecture of human cognition.

AI methods are often applied in the field of cognition, which explicitly attempts to create model subsystems of human thought processes and behavioral heuristics. In modeling human cognition, AI researchers attempt to create algorithms that mimic the human thought and learning process. AI models will examine various inputted stimuli, place the inputted stimuli in appropriate categories, and output an appropriate behavioral response based on the categorization into which the inputted stimuli lies. The algorithms created by AI researchers are intended to account for the often complex manner in which humans learn from and interact with surrounding environmental cues and stimuli.

The use of AI can be especially beneficial to non-reading sighted persons afflicted with cognitive disabilities. Various cognitive disabilities may cause a sighted person to be illiterate or unable to receive information via reading standard alphanumeric text. To aid non-reading sighted individuals physically incapable of reading standard alphanumeric text, graphic visual languages have been developed to aid communication efforts with language deficient persons. See, for example U.S. patent application Ser. No. 10/685,102. While these visual languages have proven useful in enabling non-reading sighted persons to discern the meaning of standard alphanumeric text, these languages have been static and don't allow any real time dialog between the non-reading sighted person and her surrounding environment. Current visual languages convey a single piece of information at a given point in time, and are not equipped to answer any questions posited by non-reading sighted persons, or respond to a changing environment.

As a consequence, there has been a long felt need for a graphic visual language that can provide cognitive reasoning support to non-reading sighted individual on a real time basis, and that can allow the non-reading sighted individual to respond and react immediately to various environmental stimuli. The use of various artificial intelligence algorithms and models solves this long felt need. By applying various AI theories and models, it is possible for a non-reading sighted person to query a central computing system that utilizes AI, and for the non-reading sighted person to subsequently receive instantaneous information regarding the surrounding environment. The use of AI allows non-reading sighted individuals to query the system and receive outputs based on an analysis of inputted stimuli. The use of artificial intelligence enables the system to "learn" based on user inputs and to provide solutions to user posted problems via the graphic visual communicative language.

SUMMARY OF THE INVENTION

The present invention supports and augments a person's capabilities to interact with their environment using visual language hieroglyphics and computer sensory perception. This invention provides navigational support by displaying orientation hieroglyphics in a dialog with the user similar to that of a "seeing-eye" dog and visually-disabled owner. The present invention supports and augments a person's capability to plan and problem solve. The present invention supports and augments a person's capability to learn. The present invention supports and augments a person's capability through interactive dialogue executed in real time. The present invention is an artificially intelligent method for providing visual communication and cognitive reasoning support for non-reading sighted persons.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein.

DETAILED DESCRIPTION OF PREFERRED EMBODIMENTS

Figure 1:
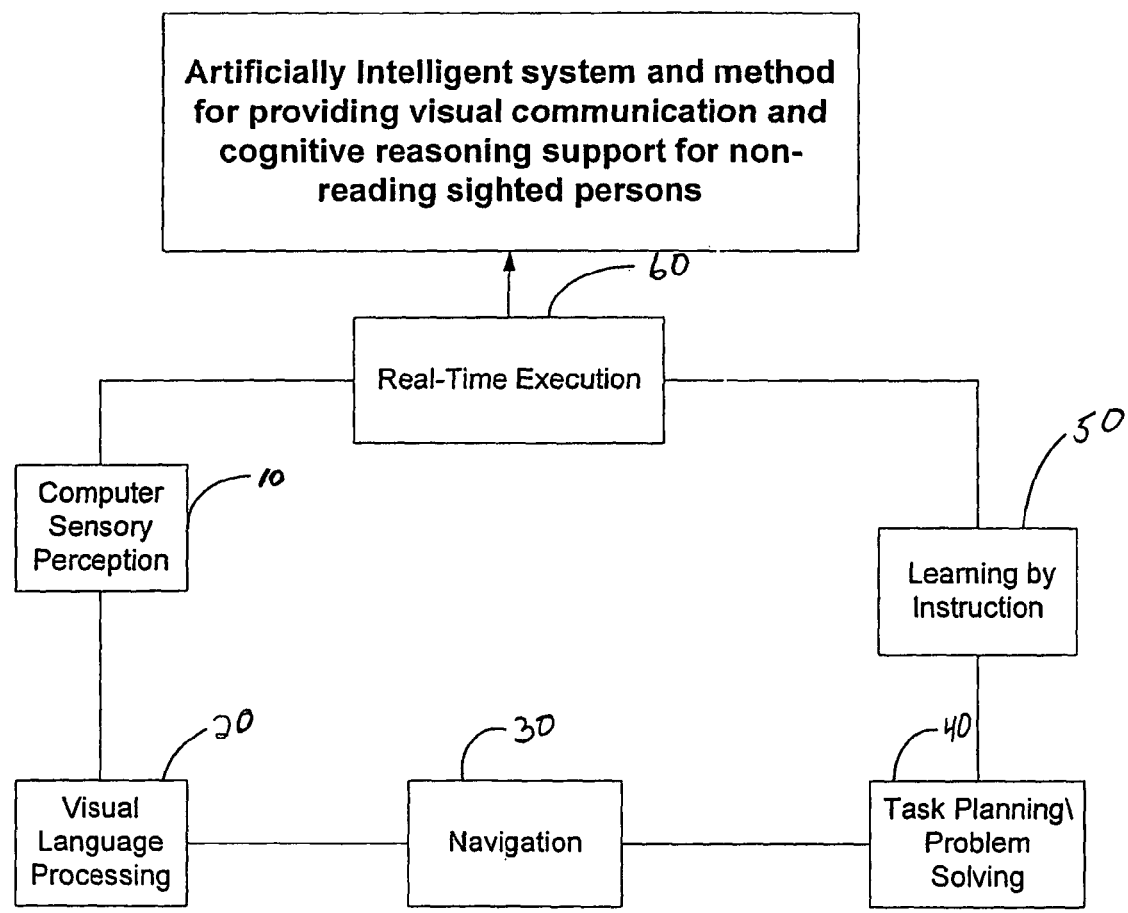
FIG. 1 is a flow chart that represents an overview of the system for providing artificially intelligent visual communication and cognitive reasoning support for non-reading sighted persons in accordance with an embodiment of the invention.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the claims, means-plus-function clauses are intended to cover the structures described, suggested, or rendered obvious by the written description or drawings for performing the recited function, including not only structural equivalents but also equivalent structures.

Referring to FIG. 1, an overview of the present invention is depicted. A computer sensory perception means 10 is utilized, e.g., via bar code, Braille code, Radio Frequency Identification (RFID), infra-red, GPS or any other machine sensory means known in the art, to initiate the sequence that the AI uses to provide a navigational system 30. The navigational system 30 is similar to a "seeing-eye dog" for the user, as it provides pertinent directional instructions and directs the user to various locations. The present invention processes the visual language and communication 20 via the system and method described in U.S. patent application Ser. No. 10/685, 102, the complete contents of which are incorporated herein. The present invention creates solutions to user problems 40, thus has the ability to provide cognitive reasoning support to the user. The present invention describes a system and method with the capability to learn from past user experiences 50 and interact with the user by providing instructions to the user based on the solutions used to solve past problems and based on user interactions with the surrounding environment. The invention's ability to react to dynamic changes in its environment can be executed on a real time basis 60, but can also be executed on a non-real time basis, depending on user preferences. Powering the present invention is a software system and/or software application package compatible with such operating systems as Windows, DOS, Linux, Windows Pocket PC, PALM or any other software means or operating systems generally known in the art.

Figure 2:
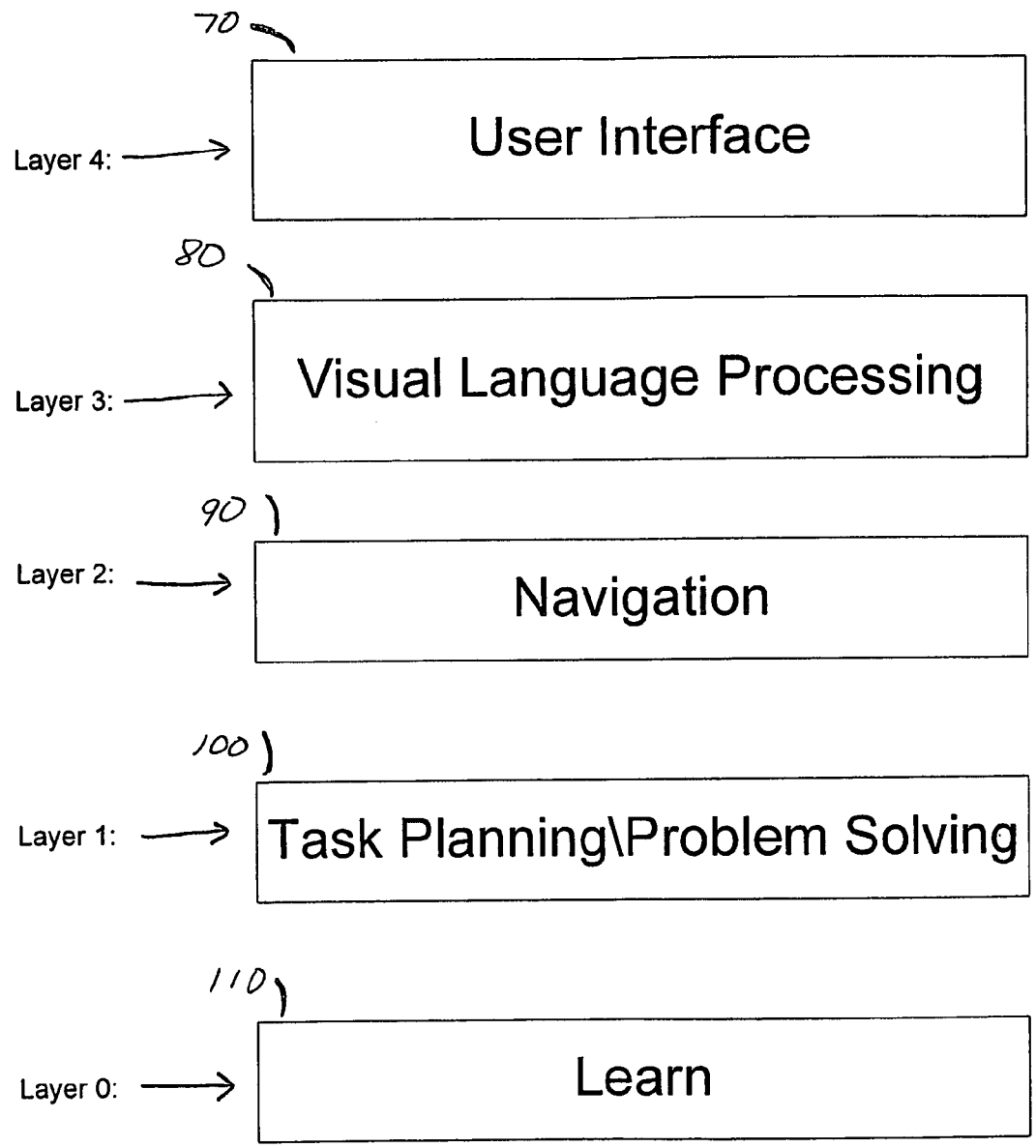
FIG. 2 is a flow chart that illustrates the architecture of the primary system layers that comprise the system for providing artificially intelligent visual communication and cognitive reasoning support for non-reading sighted persons.

Referring to FIG. 2, this embodiment enables a user to interface with the system via Layer 4 at 70 to view the hieroglyphic instructions on screen in order to respond to prompts at the highest priority of the system. In the present invention there must always be a visual dialogue with the user until the system goes "Off-Duty." Visual Language processing via Layer 3 at 80 is set as the highest priority. It has a higher priority than Navigation via Layer 2 at 90, Task Planning\Problem Solving via Layer 1 at 100, and Learning via Layer 0 at 110. Navigation via Layer 2 at 90 has a higher priority than both Task Planning/Problem Solving via Layer 1 at 100 and Learning via Layer 0 at 110. Task Planning/Problem Solving via Layer 1 at 100 has a higher priority than Learning via Layer 0 at 110.

Figure 3:
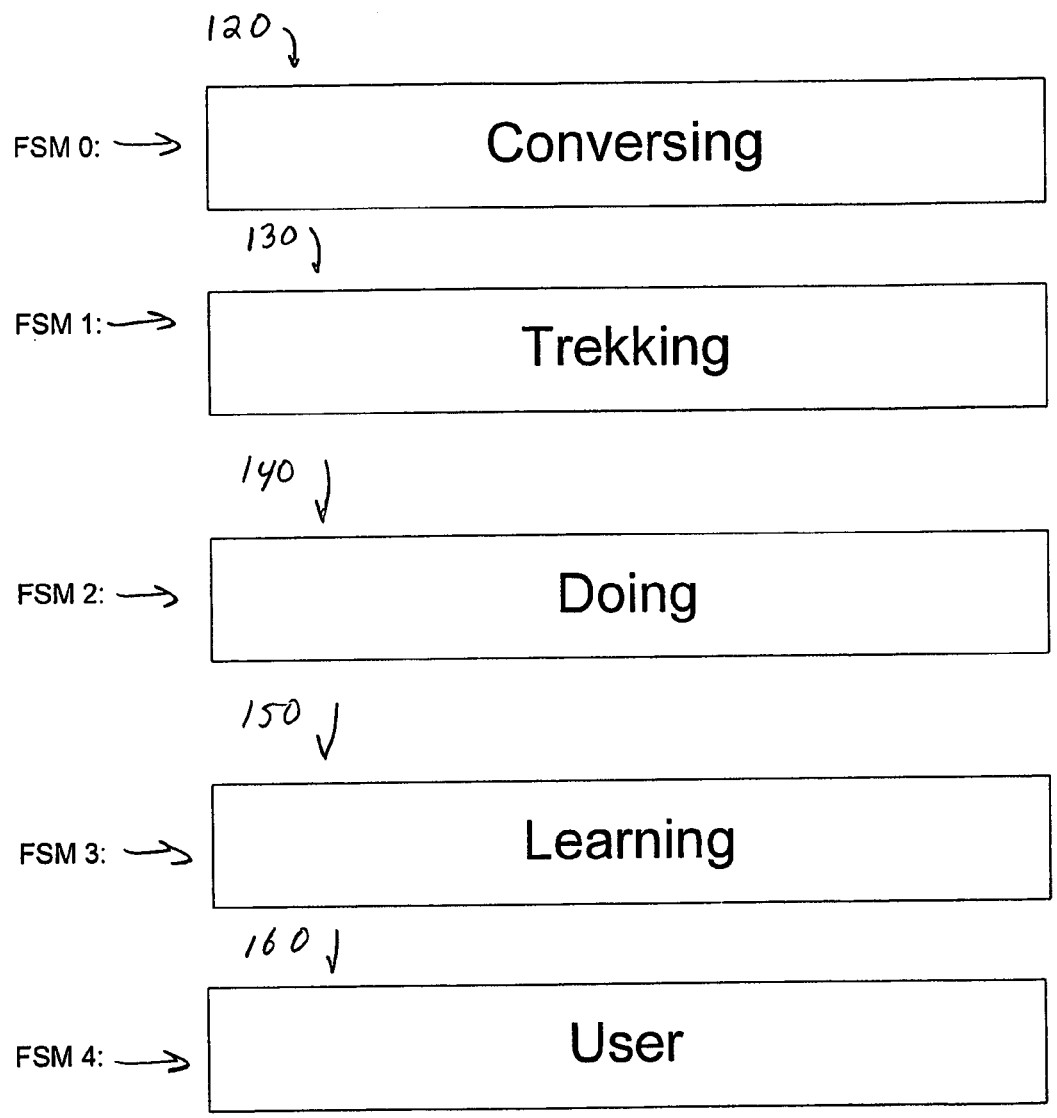
FIG. 3 is a schematic representation of one possible artificial intelligence architecture system, a Finite State Machine, complete with the five primary Finite State Machines.
Figure 4:
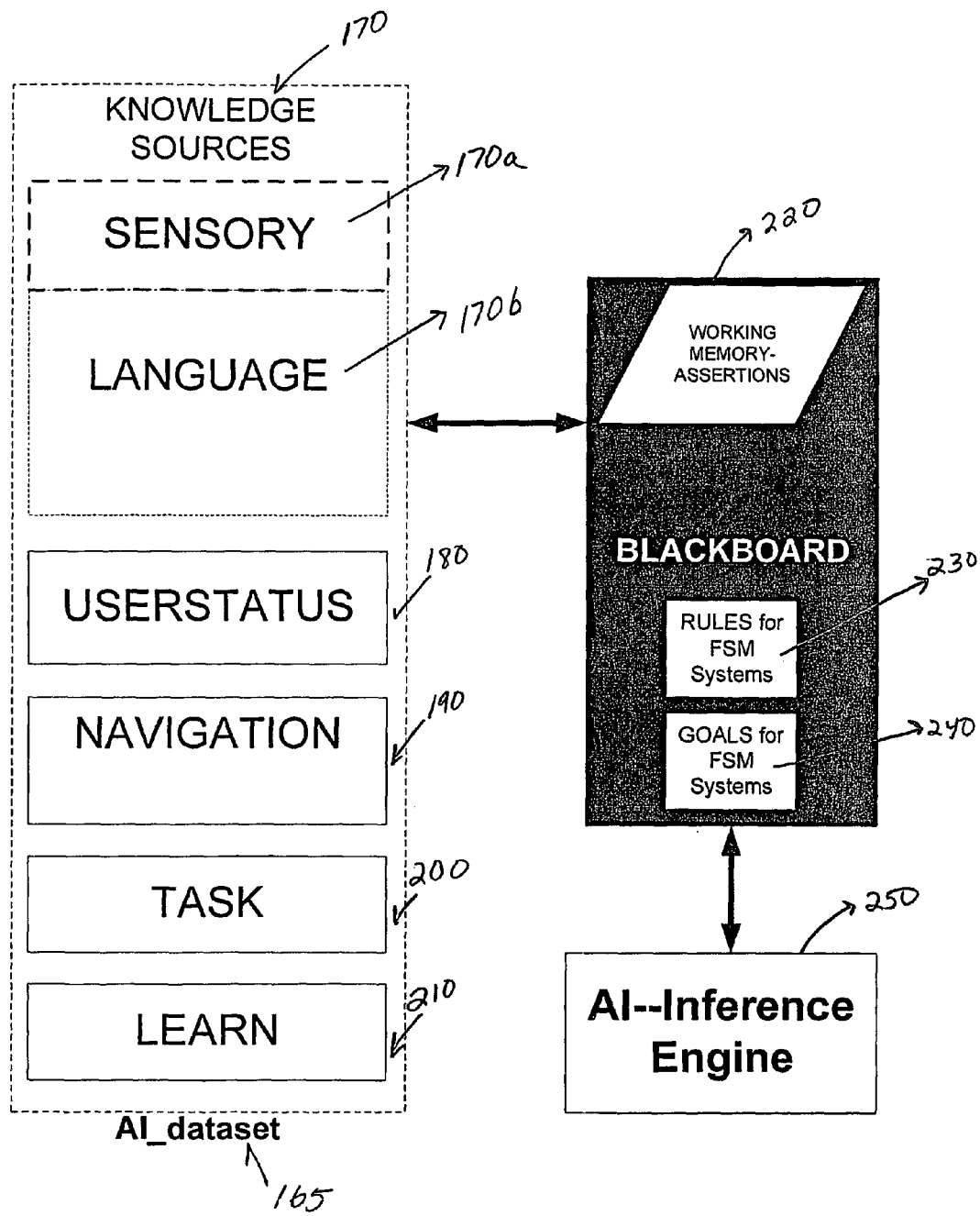
FIG. 4 is a schematic representation of one possible artificial intelligence architectural system depicting the interface between an Artificial Intelligence Dataset, the Blackboard architectural system, and the Artificial Inference Engine.

Referring to FIGS. 3-4, Finite State Machines, FSMs, are used to define a set of state systems that can be used to communicate with, direct and assist the user. A finite state machine (FSM) is a model of behavior composed of states, transitions and actions. A state stores information about the past, i.e. it reflects the input changes from the system start to the present moment. A transition indicates a state change and is described by a condition that would need to be fulfilled to enable the transition. An action is a description of an activity that is to be performed at a given moment. There are five primary FSMs used to achieve this objective, each of which provide a non limiting model of AI behavior: CONVERSING at 120, TREKKING at 130, DOING at 140, LEARNING at 150 and USER at 160. CONVERSING at 120 uses the knowledge sources, LANGUAGE at 170b and SENSORY at 170a, to establish a dialog with the user. CONVERSING is used by the other FSMs, TREKKING 130, DOING 140 and LEARNING 150, to instruct, question, answer and supervise a USER 160 as they navigate and complete tasks. TREKKING 130 uses the Navigation knowledge source 190. DOING 140 uses the Task knowledge source 200. LEARNING 150 uses the Learn knowledge source 210. USER uses the User Status knowledge source 180.

Referring to FIG. 4, the artificial intelligence architectural system "Blackboard" contains all shared knowledge data sources for the FSMs, as well as the rules for the FSM system and the goals for the FSM system. In this embodiment, the Blackboard is a hash table structure with unique keys for assertions to working memory. The FSMs read and write assertions on the Blackboard. Depending on the hardware configuration and network architecture, the AI can access this data in real-time or as batch data transfers. The AI coordinates the various FSMs and controls the Blackboard and knowledge sources: SENSORY knowledge source 170a, LANGUAGE knowledge source 170b, USERSTATUS knowledge source 180, NAVIGATION knowledge source 190, TASK knowledge source 200, and LEARN knowledge source 210, as depicted in FIG. 4. All possible outcomes of FSMs are known to the AI. The AI prioritizes the assertion and deletion of data, rules for specific FSM systems 230 or goals for specific FSM systems 240 on the Blackboard. In this embodiment, the AI is an Expert System that is both data and goal driven. The AI structure employs multiple architectures which include but are not limited to a forward-chaining and a backward-chaining structure. The forward-chaining, data-driven, structures governs the TASK 200 and LEARN 210 knowledge systems.

The LANGUAGE 170b and SENSORY 170a systems of FIG. 4 work with the available computer sensory perception hardware and utilizes bar and Braille code scanners, RFID, infra-red, GPS and other computer sensory capabilities. In this embodiment, the LANGUAGE 170b and SENSORY 170a system uses bar or Braille code scanners, the touch screen and keypad on the hand held device to explore its environment. (Please refer to patent application Ser. No. 10/685,102 for a description of the use of bar and Braille codes with the system and method for providing a visual language for non-reading sighted persons, the contents of which are incorporated herein in its entirety.) The LANGUAGE 170b and SENSORY 170a systems receive input from the user in the form of screen taps, keypad presses or scanned data input. The LANGUAGE 170b and SENSORY 170a system posts this input using appropriate data keys on the hash table blackboard. The AI Inference Engine 250 iterates through the blackboard working memory assertions 220 and determines which goal state 230 to achieve or which rule to fire 230. The AI works with the appropriate FSM and communicates using hieroglyphs to engage the user in a dialog. The user performs the action as indicated by the hieroglyphs, uses the LANGUAGE 170b and SENSORY 170a system to input their response which completes the conversation.

The user communicates with the AI using touch inputs such as key presses or screen taps and scanned inputs similar to Morris code in this embodiment. However if the hardware has the capability to support voice activated communication, the AI would receive this input through the SENSORY 170a system and reply to the user with hieroglyphs and voice via the LANGUAGE 170b system. The AI compares data, bar or Braille code values (BCV), key press (KP), or touch input (tINP) on the Blackboard against the conditions (IF parts) of the rules and determines which rules to fire. The IF parts detail the conditions or rules that must be satisfied. The THEN part specifies the action to be undertaken or assertion to be added or deleted when the rule is fired. The possible actions undertaken include adding or deleting working memory assertions to the Blackboard. The AI uses a conflict-resolution strategy to determine which rule to fire among the many that may be triggered from the "conflict set." In this embodiment, the conflict resolution strategies such as rule ordering by priority and context limiting by FSM are employed. Conflict resolution strategies include, but are not limited to these examples. In this embodiment, since the CONVERSING 120 has the highest priority, the AI must communicate with the user aI least every 15 seconds. The AI communicates using hieroglyphs, auditory and other computer sensory capabilities. The SENSORY 170a system provides the means for environmental evaluation and exploration. It also provides the means for natural language processing with the user. Therefore, the SENSORY 170a system supports the LANGUAGE 170b system.

Figure 5:
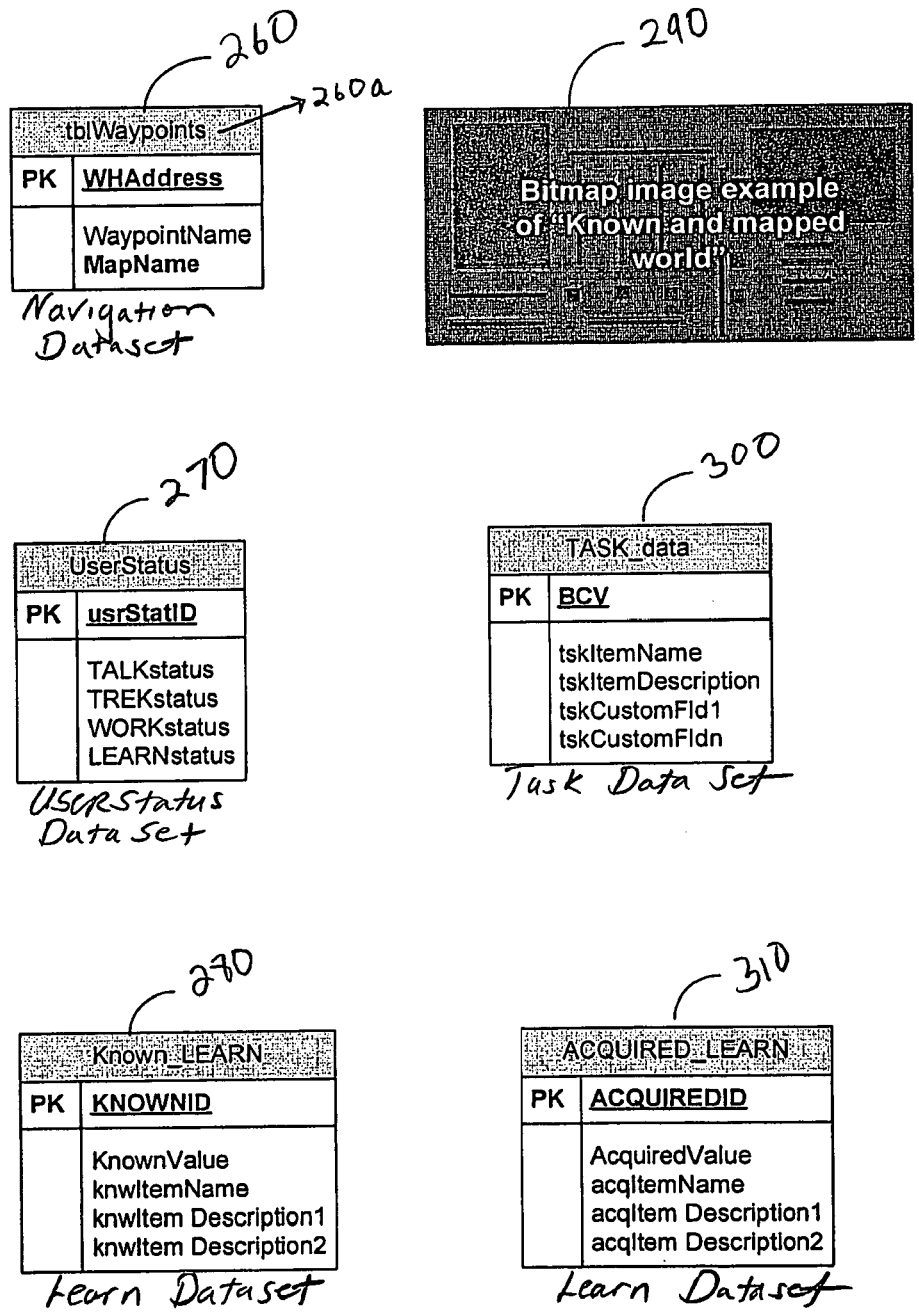
FIG. 5 is a schematic representation of the Artificial Intelligence Dataset, with examples of data and data tables housed in the Blackboard architectural system knowledge sources, in accordance with an embodiment of the invention.

The section of the Blackboard that houses all Knowledge sources is the AI dataset shown in FIG. 5. This dataset contains the Navigation dataset 260, which holds all known world maps 290 and waypoints 260a. Also included in this dataset is the TASK dataset 300, which stores the data tables needed for each task processor, the User-Status dataset 270 which holds user state data tables, and the LEARN datasets, Known Learn 280 and Acquired Learn 310. The AI checks its available data access resources for the presence of a particular AI dataset. This dataset functions as "look up" references for the AI to provide a baseline of knowledge about the "known world and environment." The AI creates a mirror image of these tables to store "discovered" data about the "explored world and environment."

Figure 6:
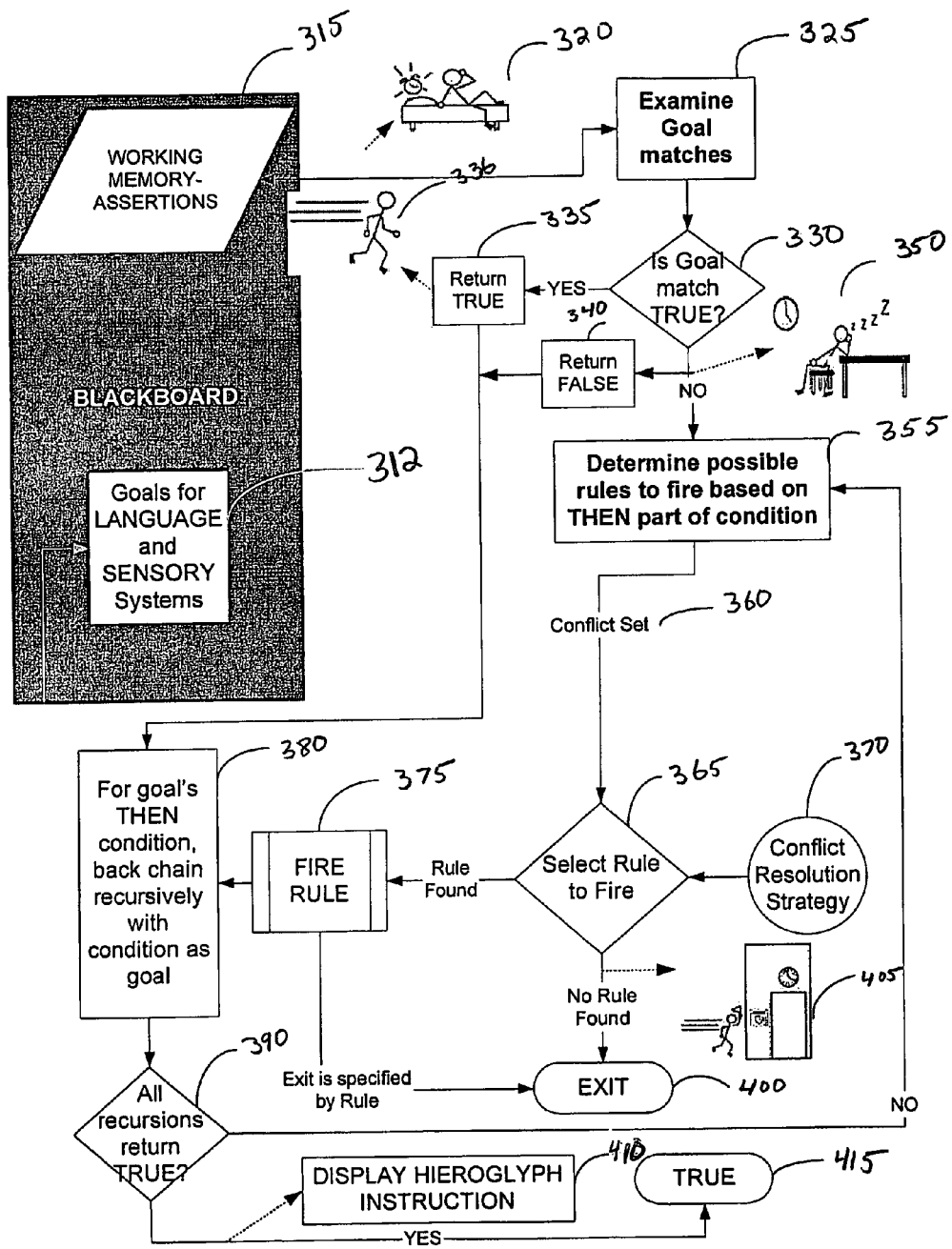
FIG. 6 is a flow chart illustrating backward chaining and the recursive structure for the goal driven Rules Based System that governs a portion of the language and sensory systems, in accordance with an embodiment of the invention.

This backward-chaining, goal-driven, system that governs the LANGUAGE and SENSORY systems is depicted in FIG. 6. Via Blackboard, the AI searches working memory assertions to see if the user has responded within the allotted 15 second interval (0→15000 milliseconds). The AI looks for bar code or Braille code values (BCV), key press (KP), or touch input (tINP) received within the fifteen second interval allotted for a user response. During this search, the system displays a hieroglyph such as "START" 320 and examines goal matches 325 in reference with working memory assertions 315. If the goal match is true 330, then return true 335 displays a hieroglyph such as "RUN" 336 to communicate to the user that the system is Awake. If the goal match 330 is not true, the system reverts to return false 340 which in turn facilitates the display of the hieroglyph "Wait" 350. At such time, the system will attempt to determine possible rules to fire based on the "then" part of the condition 355. In either case, the goal's THEN condition, will recursively back track on the decision chain to blackboard 312 with the THEN condition resetting the system at goal 380. The conflict set 360 will search for a rule that will initiate the firing of the system. If the system selects the rule to fire 365, it will initiate and fire that rule 375. The system will continue to fire the rule until either the available data satisfies all of the goals 415 and displays the hieroglyph instruction 410 or there are no more rules that match. The conflict resolution strategy 370 is similar to forward chaining. If the rule specifies Exit 400, the system communicates the system shut down using a hieroglyph such as "OFF DUTY" 405. If no rule is found, a hieroglyph such as "OFF DUTY" 405 communicates the system shut down to the user.

Figure 7:
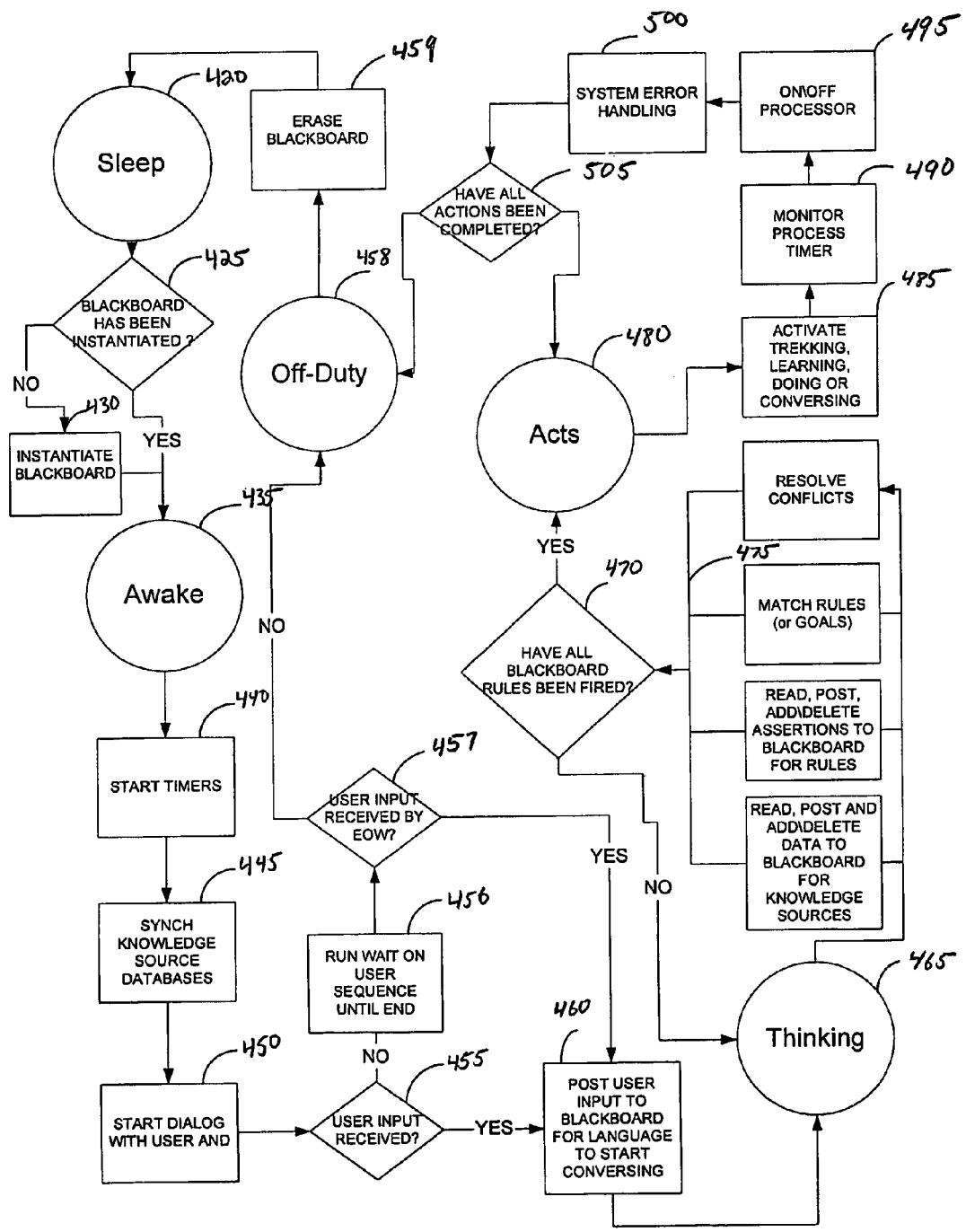
FIG. 7 is a flow chart depicting various states of possible artificial intelligence systems, in accordance with an embodiment of the invention.

In FIG. 7, the AI has five states, Sleep 420, Awake 435, Thinking 465, Acts 480 and Off-duty 458. The AI transitions from Sleep 420 when the application launches. It instantiates a new instance of the blackboard if one is not present 430. If the blackboard exists, the syllogism continues down the yes path via the blackboard decision branch 425, causing the system to enter the state of Awake 435. When at Awake 435, the system initiates all required and prescribed timers at 440. Once the timers start in step 440, the system then synchs the knowledge source databases with the blackboard 445. This then begins the initial dialog with the user at step 450. If the user responds and the user input is received at step 455, the user response is posted on the blackboard for LANGUAGE so that Conversing starts at step 460. The exchange between the user and the AI is posted to the blackboard, as the AI transitions to the Thinking state at step 465. In the Thinking state, the AI employs forward and backward chaining and conflict resolution strategies to process the appropriate rules or goals for the FSM, as illustrated in step 475. When all rules have been fired via step 470, the AI transitions to the Acts state in step 480. In the Acts state, the AI coordinates the activities of all FSMs until all needed actions have been completed in step 485. It monitors process timers via step 490, turns on\off processors via step 495 and handles system errors in step 500. Based on the AI's dialog with the user, if all needed actions have been completed in step 505, the AI will transition to Off-Duty state in step 458. If the user does not respond, the AI will run the "Wait for user" communication sequence via step 456. If no input is received from the user by the END OF THE WAIT (EOW) sequence at step 457, the AI transitions to the Off-Duty state at step 458.

Figure 8:
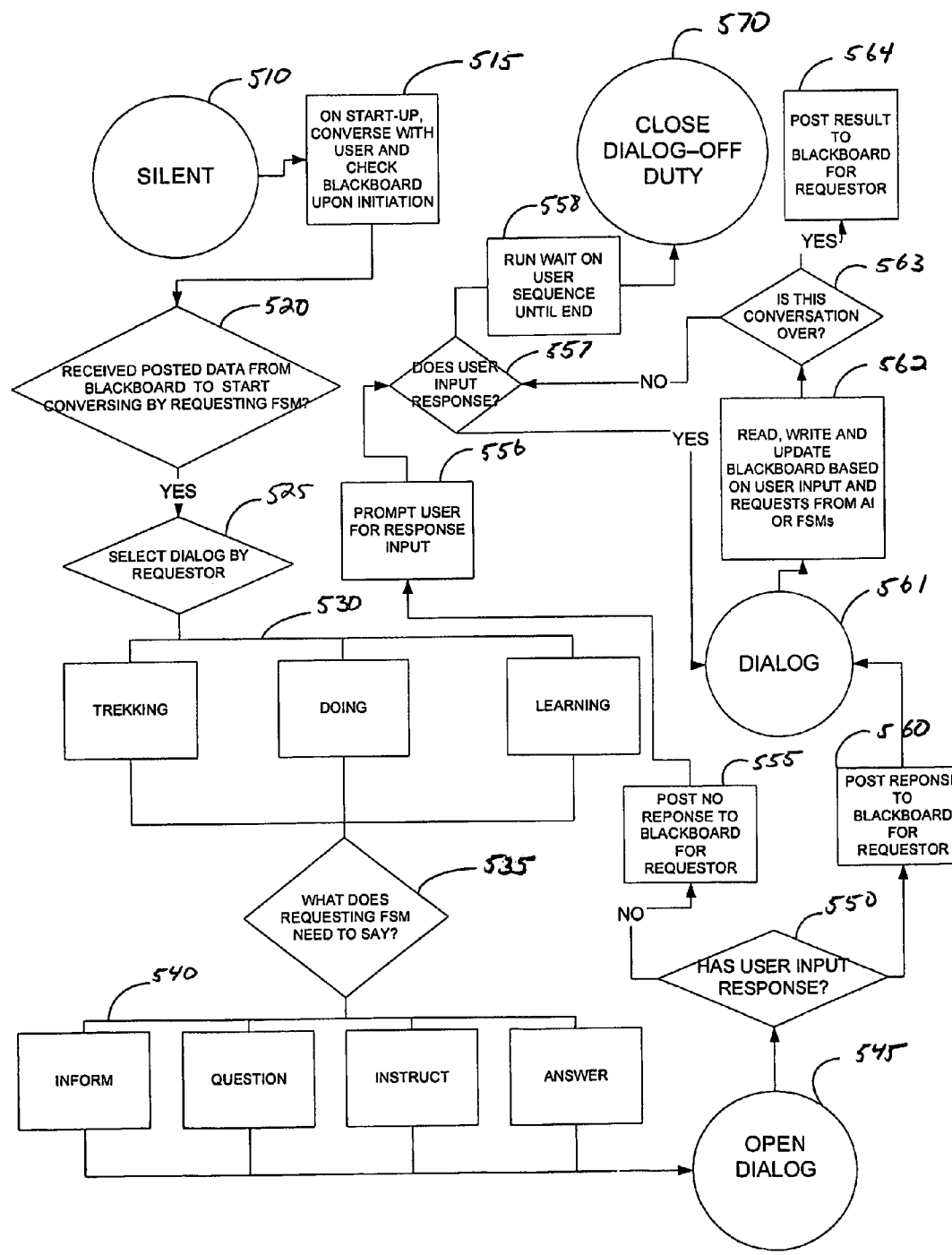
FIG. 8 is flow chart depicting various possible states of a Conversing Finite System Machine, in accordance with an embodiment of the invention.

In FIG. 8, the CONVERSING FSM has four states, Silent 510, Open Dialog 545, Dialog 561 and Close Dialog-Off Duty 570. Upon the initiation of the Blackboard, the initial conversation with the user begins at 55 which starts the transition process toward the open dialog 545 state. Based on user input using the SENSORY knowledge source 170a and the FSM requesting dialog with the user 520, at 525 the AI selects which FSM speaks via decision branch 530 and what the requesting FSM needs to say at 535 and 540. This is the transition to the Open Dialog state 545. If the user responds at 550, the response is posted to the blackboard for use by the requesting FSM at 560. This facilitates the transition to the Dialog state at 561. In the Dialog state 561, the conservation exchanges are posted to the blackboard at 562 until the conversation with the requesting FSM is over at 563 and the result is posted to the blackboard via 564. If the user does not respond at 550, no response is posted to the blackboard as depicted by 555. The user is then prompted for response at 556. If the user does not respond, as depicted in 557, the "wait for user" sequence is initiated at node 558. If there is no response at the expiration of node 558, the system moves to the to close dialog off —duty state depicted at 570.

Figure 9:
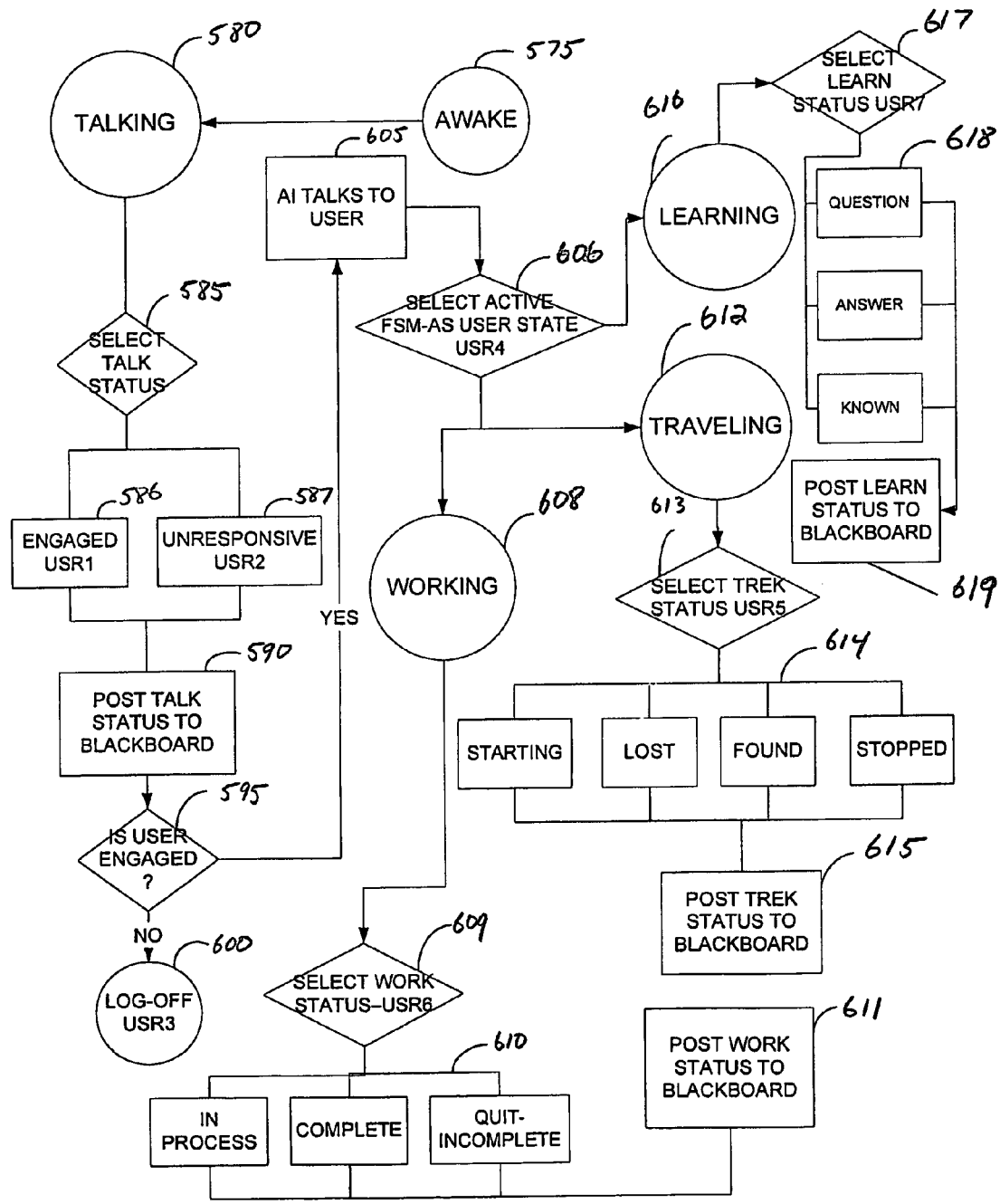
FIG. 9 is a flow chart depicting various possible states of a User Finite System Machine expressed as a Rule Based System, in accordance with an embodiment of the invention.

The user is an integral part to the AI's assessment of the surrounding environment. Since the user is an essential part of the system, the AI must monitor the user's states in addition to monitoring the software and hardware comprising the system. FIG. 9 shows the USER FSM. In FIG. 9, the AI monitors the status of the user based on user input, user response to prompts and user activity within the active FSM. The AI posts the user status to blackboard. USER FSM has six states: Awake 575, Talking 580, Working 608, Learning 616, Traveling 612 or Log-off 600. The AI changes the User State from Log-off 600 to Awake 575 when the AI reaches the Awake 575 state. The AI wakes up when a user turns on the AI; therefore, enabling the AI to surmise the user must be awake. Upon becoming awake, the AI initiates a dialog with the user and evaluates the user's talk status at 585.

The AI decides whether the user is engaged or unresponsive at 595. The rule base used when monitoring a user are annotated as "USR." USR rules include but are not limited to the CONVERSING priority rules and wait for user sequence. For example, 586 employs USR1. USR1 includes the rule that if User input has been received within the last fifteen seconds, then the system will assert talk status and engage with the blackboard at 590. At 587, USR2 is utilized. USR2 includes the rule that if User input has not been received within the last 15 seconds then the system will determine the user talk status as unresponsive to the blackboard at 590. At 600, USR3 is employed. USR3 includes the rule that if user input has not been received within a time period greater than or equal to fifteen seconds, then the user talk status will be deemed unresponsive to the blackboard and the system will revert to the Logged off state annotated at node 600.

The content of this dialog is determined by the presence or absence of an AI dataset, as previously described in FIGS. 4 and 5. In the presence of an AI dataset and the current input from the user, the AI selects the FSM mode for user monitoring at 606 such as the working node 608 or the traveling node 612. In the absence of an AI dataset, the AI activates the Learning node 616 and selects the method of information processing or gathering.

Once the AI has received the required information, it will select and activate the TREKKING, DOING or LEARNING functions. Referring to USR5 at 613, if the AI determines the FSM user mode is equivalent to the Traveling node at 612, then the Select Trek Status 613 function is utilized. The Select Trek Status 84 data values are found at 614 and include: STARTING, LOST, FOUND, STOPPED. Once the AI determines the appropriate value, the trek status is posted to the blackboard at node 613. At 609, USR6 includes the rule that if the FSM user mode equals Working 608, then the AI will examine work status data values 609, which are comprised of: in process, complete, or quit—incomplete, all of which are found at decision branch 610. Once the AI determines the appropriate value, the work status is posted to the blackboard at node 611. At 617, USR7 includes the rule that if the FSM user mode equals Learning 616, then the AI will examine the learn status data values, which are comprised of: question, answer, and unknown, all of which are found at decision branch 618. Once the AI determines the appropriate value, the learn status is posted to the blackboard at node 619.

Figure 10:
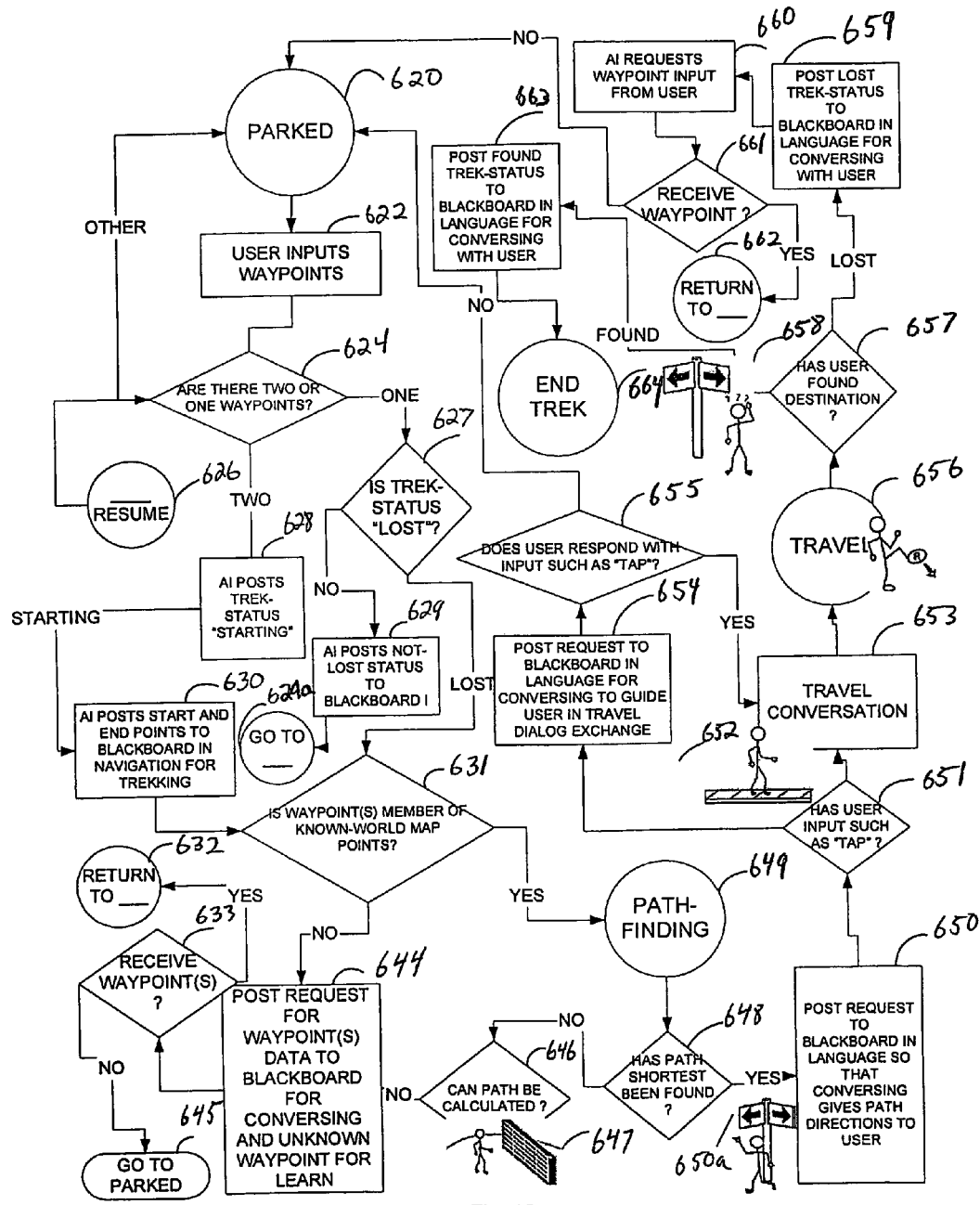
FIG. 10 is a is a flow chart depicting various possible states of a Trekking Finite System Machine in accordance with an embodiment of the invention.

In FIG. 10, the TREKKING FSM has four states, Parked 620, Path-finding 649, Travel 656 and End Trek 664. The user initiates the transition from Parked 620 by scanning bar or Braille coded waypoints as inputs in node 622. In this embodiment, the bar or Braille code value contains a key prefix "WHA" which is unique and used only for marking traversable waypoints in the physical environment. The user scans a bar or Braille coded waypoint plaque. This method is analogous to Braille navigation plaques posted in public areas to guide sight-impaired or sightless users within public access buildings. For further illustration, the AI has a map of all known waypoints within the user's known world, based on past places visited and experienced. The AI receives the inputs as a request to travel. If two separate waypoints are received 624, it posts the way points in the order received as the start and end points under the Navigation mode on the blackboard 630 and trek status as "start" 628. If the trek status is not "lost" 627 the AI will post not lost status to the blackboard 629 which triggers the go to node of 629a. The transition from the Parked state to the Path finding state occurs when the AI evaluates 631 the start and end points to determine if they are members of the set of known-world map 290 and waypoints points 260a as previously described in FIG. 5. If they are, the transition to the Path finding state is complete, as annotated at 649. In the path finding state, the path is calculated using path finding algorithms such as: a star algorithm, a Dijkstra algorithm, or other heuristic search algorithms well known in the art. The search will attempt to isolate the shortest navigable path at 648.

The user is able to determine direction by viewing the "Navigation2" hieroglyph at 650a. The shortest calculated path to destination direction-data is posted to the blackboard for Conversing at 650. The "wall" hieroglyph 647 represents any non-traversable obstacle that may block the user's path. If the shortest path can not be calculated 648, then a request for new waypoints is posted to blackboard 644.

Once the shortest route is calculated, the travel dialog starts when AI displays the "Walk" hieroglyph to the user at 652. The user acknowledges the hieroglyph at 652 by inputting the touch-screen 651. If the user does not acknowledge the output by inputting the touch screen 651, then the AI posts request to blackboard for Conversing at 650 to again prompt the user to initiate traveling at 654 by acknowledging the viewed hieroglyph 652. If, after repeated prompts, the user does not initiate travel at 655, then the AI returns the system to the parked state 620. If the user initiates traveling at 655, then the travel conversation begins at 653 and transitions to Travel state 656. Travel state 656 continues outputting "Navigation" hieroglyphs 658 until the user reaches the desired end destination "Found" at 657, at which point the trek status "Found" 663 is posted to blackboard. The journey ends at END TREK 664.

If the user only enters one waypoint or only one waypoint is received 624, the AI will decide if the trek status is "Lost or not-Lost" via node 627. If it is determined that the user is "not-lost," the AI requests a second waypoint for destination from user at 644. If the user then scans waypoints 633, then the system returns to the resume node 626 to determine how many waypoints have been input at 624 If user does not scan any further waypoints at 633, then the system will revert to the "Go to Parked" state at 645.

While operating in the Travel state mode, the TREKKING FSM uses backward-chaining and recursion to determine if the user is "Lost" or "Found" in reference to the "Navigation" hieroglyph 658. In this embodiment, the nearest waypoint to the user would be scanned as a present physical location input. If an unexpected waypoint is scanned, then trek status "Lost" 657 is posted to blackboard 659 and the AI will request the user to scan waypoint 660. A new path must then be calculated from the user's current position. If the user submits a new waypoint 661, the state transition "returns from the Travel state to 100" at 662 and the transition conditions start again as if it occurred prior to the Path finding state. Once it is determined that the user is "lost" and it has been posted to the blackboard and one waypoint has been received, the AI will continue to evaluate so long as the newly scanned waypoint is a member of the "known-world" 631. When the destination is found, the AI posts the found status to blackboard for Conversing at 659. The transition and process will then continue to the End Trek state 664.

Figure 11:
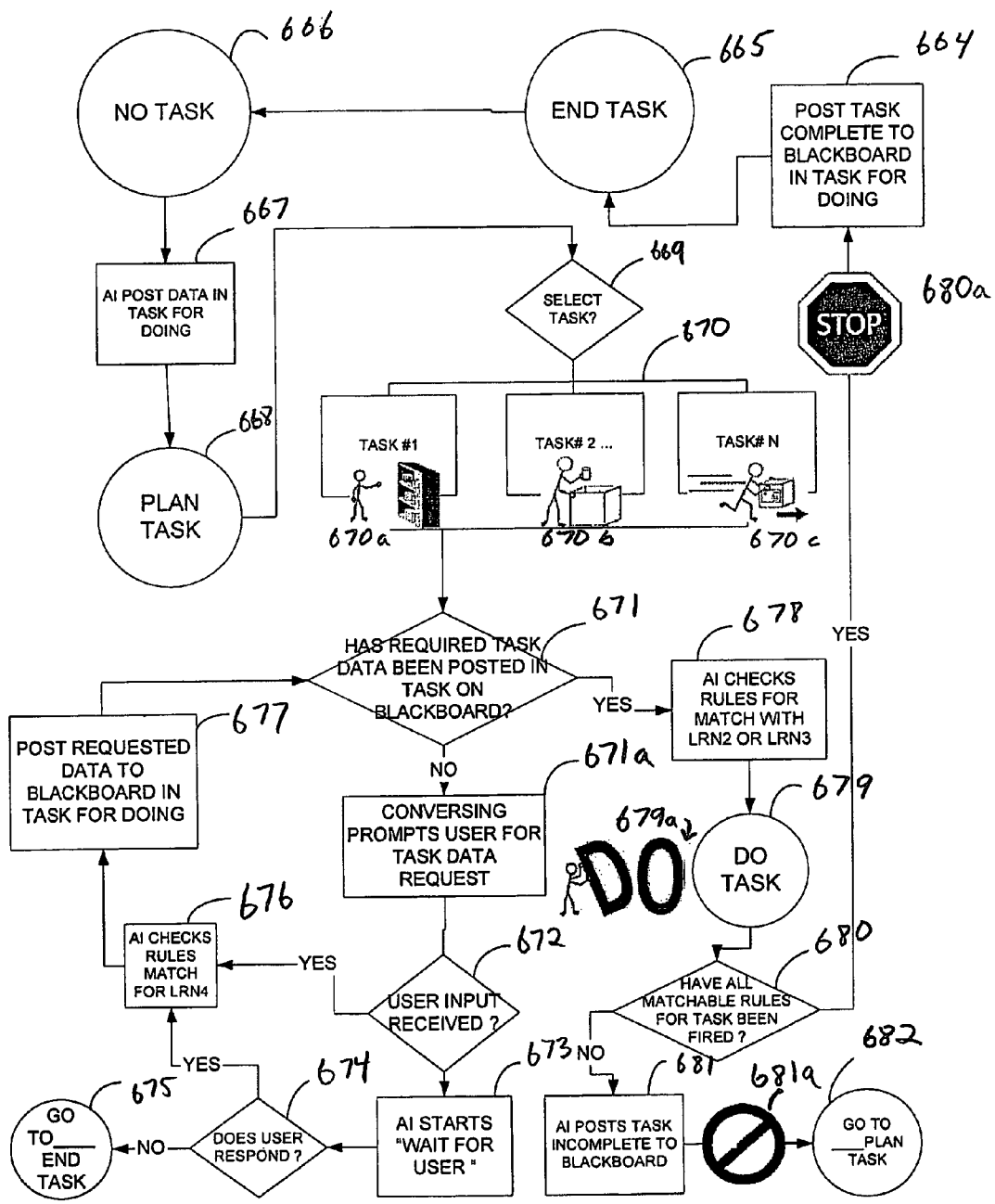
FIG. 11 is a flow chart depicting various possible states of a Doing Finite System Machine in accordance with an embodiment of the invention.

Referring to FIG. 11, the DOING FSM has four states: No Task 666, Plan Task 668, Do Task 679 and End Task 665. The transition from the No Task 666 state to the Plan Task 668 state occurs when the AI posts data in the task for doing at 667, which is data that mirrors the data found in Task data set 300 in FIG. 5. In the Plan Task state 668, the appropriate task processor is selected at 669. At 670, each Task process is enumerated, starting with the integer 1. In this particular example, 670a-c shows examples of 3 hieroglyphs for task processors, "Get" 670a, "Pack" 670b and "Ship" 670c, as they are communicated to the user. Which processor is selected is based on the rules for its data requirements as illustrated at 671. If all required data has been posted to the blackboard for the selected task processor, then the AI checks the match rules with the Learning node 678. The DOING state transitions from the Plan Task state to the Do Task state at 679. If the required data has not been posted to the blackboard for the selected task 671, DOING posts task data requests to Conversing for the user at 671a. If the user inputs the requested data at 672, the AI checks the Learning rules for a match 676. The requested data is posted to blackboard at 677. If all the required data has been posted at 671, then the AI will check the learning rules for a match at 678. If the requested data is not posted to the blackboard at 672, the AI launches "Wait for User" sequences at 673. If the user responds at node 674, then the AI checks the Learning rules for a match at 676. The requested data is posted to the blackboard at 677. If all the required data has been posted at 671, then the AI checks the learning rules for a match at 678.

The "Do" hieroglyph 679a is one of the verbs shown to instruct the user in the Do Task state 679. DOING matches the selected task's rules with assertions for the task and fires the appropriate rules until all the matchable rules have been fired at 680. DOING posts the results on the blackboard at 664. The "Stop" hieroglyph 680a is one symbol that is shown to the user to illustrate the end the task. DOING transitions from DO Task to End Task when all matchable rules have been executed 665. If all the matchable rules for a task have not been fired 680, then the AI will post task incomplete to the blackboard at 681. The "No" hieroglyph 881a is one of the instructions that is shown to the user to tell them the task is not finished, and will initiate the "Go to 128 Plan Task" at 682, which resets Doing back to the Planning Task state at 668.

In the embodiment depicted in FIG. 11, DOING and LEARNING work together to resolve unmatched $BCV_S$ and unexpected tINPs and KPs, as illustrated by 678 and 676. There can be numerous task processes utilized within the system. In this embodiment, task processors include but are not limited to: sort, count, add, subtract, pick, pack, collate, ship, mail, find and more.

Figure 12:
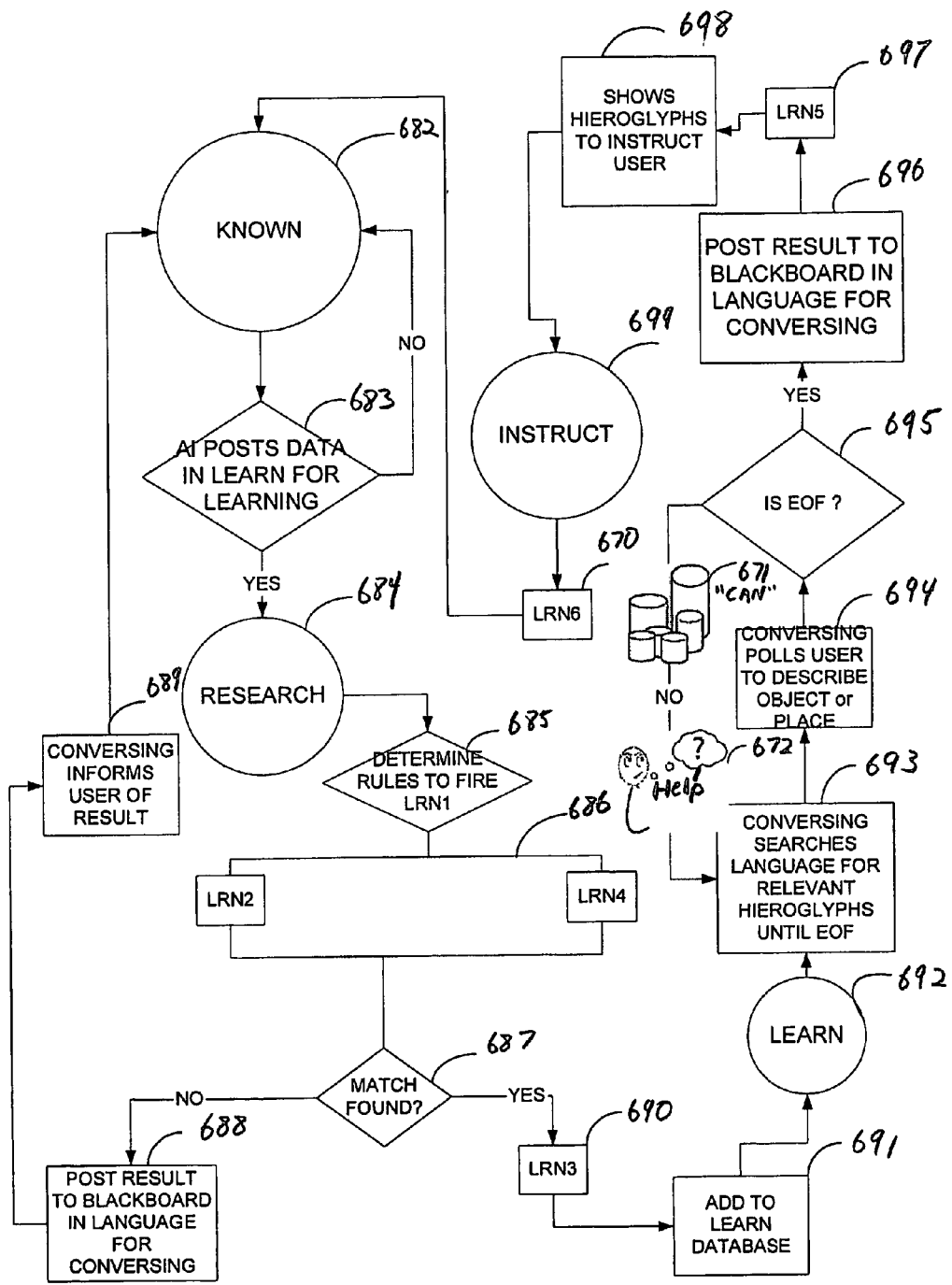
FIG. 12 is a flow chart depicting various possible states of a Learning Finite System Machine, expressed as a Rules Based System in accordance with an embodiment of the invention.

Referring to FIG. 12, the LEARNING FSM has four states: Known 682, Research 684, and Learn 692, Instruct 699. The LEARNING FSM transitions from the Known 682 state to the Research state 684 when the AI posts an unknown BCV or error input to the blackboard at Learn 683. First, LEARNING determines which rule to fire 685 between either LRN2 or LRN4 in a forward-chaining structure 686. If a match is found via 687, the system will fire LRN3 690. Data is added to the Learn database 691 as LEARNING transitions from the Research state to the Learn state 692.

In Learn state 692, Conversing searches Language for relevant hieroglyphs until the end of file ("EOF") at 693. Conversing polls the user to describe various objects using the available hieroglyphs 694. If the user has not reached the EOF 695, the system will continue to loop through the available hieroglyphs such as, but not limited to "Can" 671 and "Help?" 672. If the user reaches the EOF 695, then the results are posted to blackboard 696. This in turn initiates the firing of Learn Rule 5, i.e. LRN5 at 697. The AI uses hieroglyphs to instruct the user at 698 which facilitates the transition into the Instruct state at 699. In the Instruct state, Learn rule 6 (LRN6) is fired at node 670, which facilitates the transition to the Known state at node 682.

In the Learn state, LEARNING posts requests to Conversing for hieroglyphs that are potential matches for the new object that the user has encountered. The dialog between Conversing and the user becomes a question and answer exchange. For illustration, the "Help" hieroglyph 672 asks the question and the "Can" hieroglyph 671 shows example. The user inputs the screen for "Okay" or for "No." This forms the question and answer dialog "Object looks like this . . . " or "Does not look like this . . . " for LEARNING to gather information about the new object. The AI decides which subset of hieroglyphs based on description category rules. The Learn state continues polling for description form user until all relevant hieroglyphs have been evaluated at end of file, EOF 695. LEARNING transitions from Learn state to Instruct state after reviewing hieroglyphs 699.

Referring to the Learn Rules illustrated in FIG. 12 for the LEARNING FSM, they are defined as follows:

(1) LRN1 at 685 is used to determine which rules to fire and initializes the process timers. If the user is in a DOING FSM state, the system will initiate the DO TASK state of 679 found in FIG. 11, and the system will then also Launch the process timer for the duration of the active task until the DOING FSM state continues to the END TASK state. The system will monitor the user input values for $BCV_S$, tINP, OR KP which initiates the firing of LRN2 or records an ERROR value via the firing of LRN4;

(2) LRN2 at the branch of 686 determines if the $BCV_S = BCV_{LDB}$. $BCV_S$ stands for the scanned bar or Braille code value and $BCV_{LDB}$ stands for the stored Learn knowledge source. Both of these values are then asserted to the blackboard as known values. The subsequent use is determined by AI;

(3) LRN3 at node 690 is applicable and fires if $BCV_S<>BCV_{LDB}$ (i.e., not equal) which results in an assertion to Blackboard to record the $BCV_S$ as a new data entry in the Learn knowledge source. The AI will ask the user to describe the new data entry based on existing hieroglyph vocabulary. The Conversing stage will engage the user is a question and answer format to find out what the new object looks like or what it does not look like via LRN3 690. Each response is asserted to blackboard as a descriptive field entry for the current $BCV_S$ at 691. The exchange between the user and the system continues until all relative hieroglyphs have been evaluated for descriptive relevance 693;

(4) LRN4 at the branch of 686 is applicable and fires if $BCV_S$, tINP, OR KP are greater or less than the expected input value or type, which in turn indicates an Input ERROR 687. The ERROR 687 is asserted to the blackboard for Learn productivity monitoring at 688. The AI will post monitor data to Language for Conversing. Conversing will inform the user of the error and induce the proper corrective actions by using hieroglyphs at 689;

(5) LRN5 at the branch of 697 is applicable and fires if the relevant hieroglyphs are at the end of the file as illustrated in node 695, which in turn posts requests to Conversing to instruct the user at 698. The User is given directions for task completion;

(6) LRN6 at node 670 is applicable and fires if the user has completed all hieroglyphic instruction with Conversing or no instruction prompts remain unanswered, which initiates the transition from the Learning state to the Instruct state to the Known state. Assert state change to blackboard.

Figure 13:
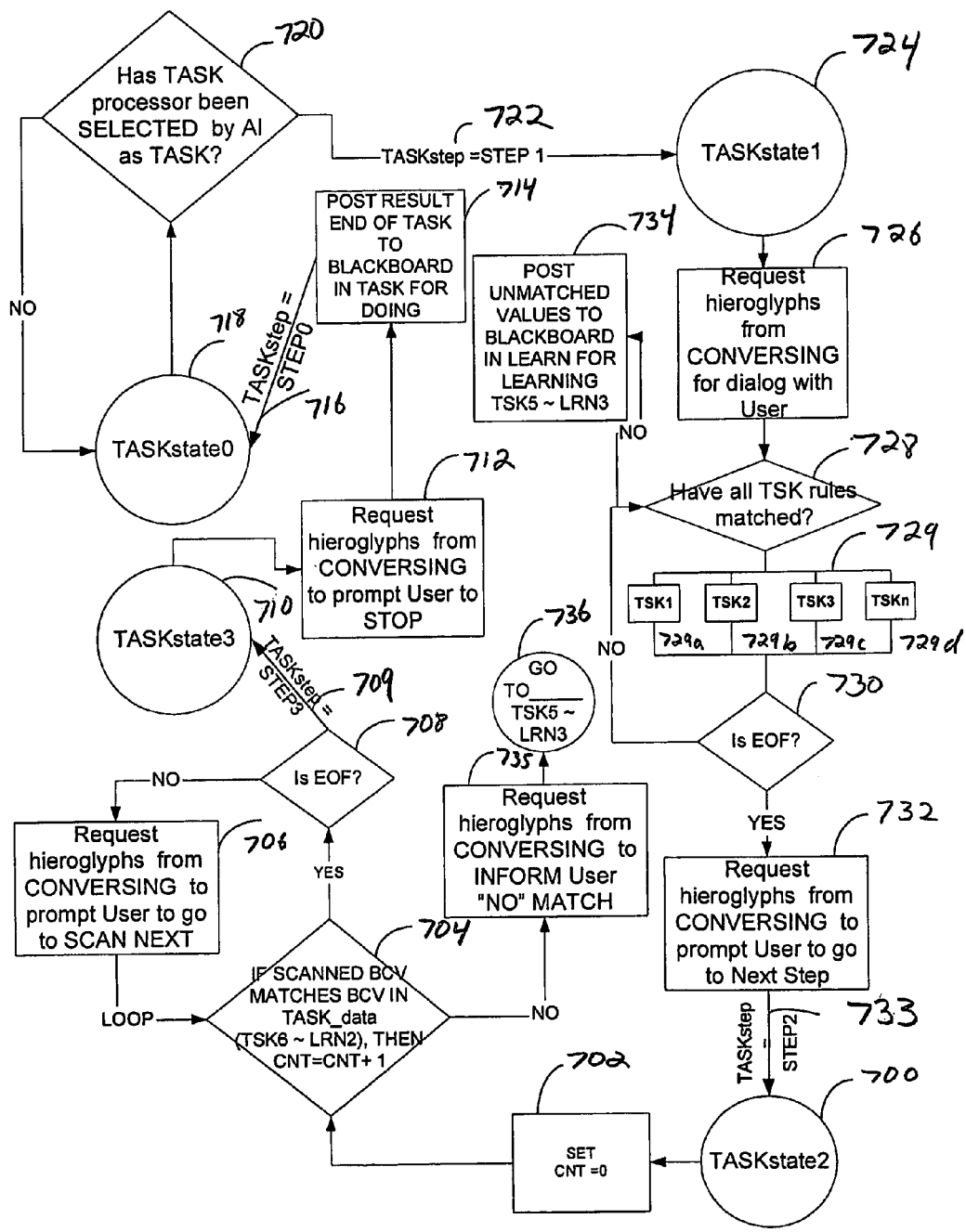
FIG. 13 is a flow chart illustrating the various Task processes activated by virtue of the Doing Finite System Machine, expressed as a Rules Based System in accordance with an embodiment of the invention.

Referring to FIG. 13, which illustrates an embodiment of a TASK processor's functions within the present invention, the user must identify items based on the item's BCV and the item's physical appearance. The user must talk with the AI to complete each step of the task. The AI shows the user how to complete the task using by using hieroglyphs. The dialog between the user and the AI is based on an exchange of hieroglyphs, bar code scans ($BCV_S$), touch screen taps (tINP) and key presses (KP). Based on these inputs, the AI shows the user how to correct mistakes and tells the user when the task has been completed. To carry out a specific TASK in FIG. 13, the users most complete the following steps:

STEP 0 at 716. The TASK state machine must be started. In this embodiment, the AI asserts a processor call to Blackboard for TASK processor 720;

STEP 1 at 722. Identify the items TASK by scanning the BCV and compare identification variables $X_1$=tskItemName, $X_2$=tskItemDescription for each item into the working memory database 724;

STEP 2 at 733. Tally the quantity by BCV at node 700;

STEP 3 at 709. Determine if the TASK is complete, and if the TASK is complete, end process at 710.

In addition to the User carrying out the steps outlined above, the TASK process must also go through various steps in order to assist the user with the TASK. The steps used by the Task Process to assist the user are as follows:

1) TASKstate0 at 718. If a Task process is called via an AI to the Blackboard at 720, then the TASKstep=Step 0 at 718 is advanced to TASKstep=Step 1 at 724, by identifying items by BCV and comparing identification variables. These assertions are placed in the working memory in the Add/delete form;

2) TASKstep1 at 724. During Taskstep1 if the KP is either greater or lesser than the integer 1, and the system has not reached the EOF, then the request hieroglyph from CONVERSING prompts the user to SCAN at 726. The scanned data is stored in working memory. This sequence is repeated until all TSK rules have been fired 730 and the system reaches the EOF, which places all known items in the identified bin at TSK6~LRN2 704 and all unknown items will be entered into the LEARN knowledge source at TSK5~LRN3 736;

3) TASKstate2 at 700. During TASKstate2 the system sets the count at zero at step 702. If the BCV is equal to null at step 704, then the system will request a hieroglyph from CONVERSING to prompt the user to SCAN 735 and proceed to the "Go to 165 TSK5~LRN3" at 736. IF $BCV_{scanned}$=BCV in the TASK_data 10 in FIG. 5, then the system will request hieroglyphs from Conversing to prompt the user to "Scan" "Next," via node 706. This loop will continue until the EOF at 174;

4) TASKstate3 at 710. If during TASKstate3, the KP equals 1, then the request hieroglyph from CONVERSING will prompt the user to stop TASK 712.

Posting the result "end of task" to the blackboard for DOING at 714. In this embodiment, the AI assists the user in identifying the items by helping the user analyze each item based on the rules base for item identification. The user can communicate dynamic adjustments to dialog flow and content with the AI by inputting BVC, KP or tINP during the TASK process that prompt the AI to activate LEARNING. The user communicates the amount of help needed from the AI.

It is to be understood that the present invention is by no means limited only to the particular constructions herein disclosed and shown in the drawings, but also comprises any modifications or equivalents within the scope of the claims.

What is claimed is:

1. A method for sighted persons who cannot read a standard alphanumeric text to interact with their environment by pictorially communicating with the environment via computer sensory perception, comprising the steps of:

converting an alphanumeric text to a machine-readable set of informationally corresponding data;

scanning said first machine-readable set of informationally corresponding data so as to obtain an informational content data set;

correlating said informational content data set with one or more hieroglyphs that are representative of the actions, physical objects and the relationship between said actions and said physical objects presented by said informationally corresponding data set;

arranging said one or more hieroglyphs syntactically to pictorially represent said informationally corresponding data set for said sighted persons thereby to inform said sighted person of said actions, objects and the relationship between said actions and said objects as was originally presented in said standard alphanumeric text;

enabling said sighted person to interact with an environment via computer sensory perception and enabling said user to act on the information conveyed by the hieroglyphs;

having said sighted person input the interaction with the environment, said input recorded via a computer processing means and added to the informational content data set; and said computer processing means analyzing said sighted person inputs from the environment and isolating those inputs not already present in the informational content data set and assigning additional hieroglyphs that are representative of the new actions, new physical objects and new relationship between said actions and said physical objects presented by said informationally corresponding data set, the additional hieroglyphs used to allow the informational content data set to adapt to new environments and provide cognitive reasoning support and learning to the sighted person.

2. A method according to claim 1 including scanning said alphanumeric text with an optical character reader so as to convert said alphanumeric text to said machine-readable set of informationally corresponding data.

3. The method according to claim 1, wherein the cognitive reasoning support is comprised of navigational support and directional orientation to said sighted person.

4. The method according to claim 1, wherein the computer processing means is comprised of artificial intelligence.

5. The method according to claim 1, wherein the said computer processing means is executed on a real time basis.

6. A system for enabling sighted persons who cannot read a standard alphanumeric text to pictorially communicate and interact with an environment via computer sensory perception, comprising: data entering means for acquiring alphanumeric text; encoding means for converting said alphanumeric text into a machine-readable set of informationally corresponding data; decoding means for correlating said informational content data set with one or more hieroglyphs that are representative of the actions, physical objects and the relationship between said actions and said physical objects presented by said informationally corresponding data set and arranging said one or more hieroglyphs syntactically to pictorially represent said informationally corresponding data set for said sighted persons thereby to inform said sighted person of said actions, objects and the relationship between said actions and said objects as was originally presented in said standard alphanumeric text; computer sensory perception means for enabling said sighted person to interact with an environment and act on the information conveyed by the hieroglyphs; and for recording inputs enabling said sighted person to record said sighted person's interaction with the environment; and said input analyzed via a computer processing means and added to the informational content data set, the computer processing means isolating those inputs not already present in the informational content data set and assigning additional hieroglyphs that are representative of the new actions, new physical objects and new relationships between said actions and physical objects presented by said informationally corresponding data set, the additional hieroglyphs used to allow the informational content data set to adapt to new environments and provide cognitive reasoning support and learning to the sighted person.

7. The system according to claim 6 wherein said machine-readable set of informationally corresponding data comprises a flat Braille symbology.

8. The system according to claim 6 wherein said correlation of said informational content data set with one or more hieroglyphs includes a relational database.

9. The system according to claim 8 wherein said relational database is selected from the group consisting of Microsoft Access™, Microsoft SQL Server™, MySQL™, SQL.

10. The system according to claim 7 wherein said flat Braille symbology comprises matrix having two columns of dot-squares by three rows of dot-squares that together represent a single character unit.

11. The system according to claim 10 wherein said dot-squares are identified by a reference character for ease of manipulation as a portion of a data analysis software program.

12. The system according to claim 6 wherein said each character of an alphanumeric text is represented as a unique combination of dot-squares.

13. The system according to claim 10 wherein said matrix comprises a predetermined lateral spacing and a predetermined longitudinal spacing defined between adjacent dot-squares.

14. The system according to claim 10 wherein said matrices are positioned adjacent to one another with a start pattern and a stop pattern positioned therebetween to indicate the beginning and end of each matrix.

15. The system according to claim 10 wherein said information encoded in said matrix represents at least one standard Braille code symbol.

16. The system according to claim 6 wherein said computer sensory perception means comprises generation of an electronic signal wherein a signal voltage alternates between two preset voltage levels, one representing a black dot and one representing a white dot such that said alternating pulses of high and low voltage levels correspond to a presence or absence of said black and said white dots in a scan line wherein a sequence of alternating voltage pulses is presented for decoding and creation of said informationally corresponding data set.

17. The system according to claim 6 wherein said computer sensory perception means comprises an optical scanner.

18. The system according to claim 6 wherein said computer sensory perception means comprise a handheld optical scanner.

19. The system according to claim 6 wherein said data entering means are selected from the group consisting of a keypad, optical scanner, and magnetic card reader.

20. The system according to claim 6, wherein the cognitive reasoning support is comprised of a navigational support and direction orientation to said sighted person.

21. The system according to claim 6, wherein the computer processing means is comprised of artificial intelligence.

22. The system according to claim 6, wherein said computer processing means is executed on a real time basis.

23. The system according to claim 6 wherein said correlation of said informational content data set with one or more hieroglyphs includes a non-relational database.

24. The system according to claim 6 wherein said computer sensory perception means comprise a Radio Frequency Identification (RFID).

25. The system according to claim 6, wherein such computer sensory perception means comprise digital auditory capabilities.

* * * * *